(12) United States Patent
Kerselaers

(10) Patent No.: US 8,532,568 B2
(45) Date of Patent: Sep. 10, 2013

(54) RADIO RECEIVER AND TRANSMITTER CIRCUITS AND METHODS

(75) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 244 days.

(21) Appl. No.: 13/151,779

(22) Filed: Jun. 2, 2011

(65) Prior Publication Data

US 2011/0300801 A1 Dec. 8, 2011

(30) Foreign Application Priority Data

Jun. 3, 2010 (EP) .................................... 10164872

(51) Int. Cl.
*H04B 5/00* (2006.01)
*H04B 5/02* (2006.01)
*H01Q 7/00* (2006.01)

(52) U.S. Cl.
USPC ............ 455/39; 455/41.1; 343/726; 343/867

(58) Field of Classification Search
USPC ........................... 343/726, 867; 455/41.1, 39
See application file for complete search history.

(56) References Cited

U.S. PATENT DOCUMENTS

| 6,940,466 B2 | 9/2005 | Terry |
| 2008/0267436 A1 | 10/2008 | Kerselaers et al. |

FOREIGN PATENT DOCUMENTS

JP 07-303006 A 11/1995

OTHER PUBLICATIONS

Extended European Search Report for European Patent Appln. 10164872.3 (Nov. 15, 2010).

*Primary Examiner* — Temesgh Ghebretinsae
*Assistant Examiner* — James J Sterling

(57) ABSTRACT

A transmitter/receiver circuit comprises a wireless transmission/reception circuit having a first inductor for generating/detecting a magnetic induction field onto which an output of a radio frequency circuit is modulated and a second inductor in series with the first inductor for generating/detecting an electric induction field onto which the output of the radio frequency circuit is modulated. The second inductor comprises an electrically conductive track which at least partially surrounds a grounded electrically conductive core.

The invention thus provides the transmitter and receiver for a communication system using near fields, and in which the input/output of the radio frequency circuitry can be balanced. The first coil produces the main magnetic induction field and the second coil is activated as an antenna producing an electric induction field. By this method, the operating range is increased and the relative positioning between both communication ends is less sensitive.

12 Claims, 5 Drawing Sheets

FIG. 2
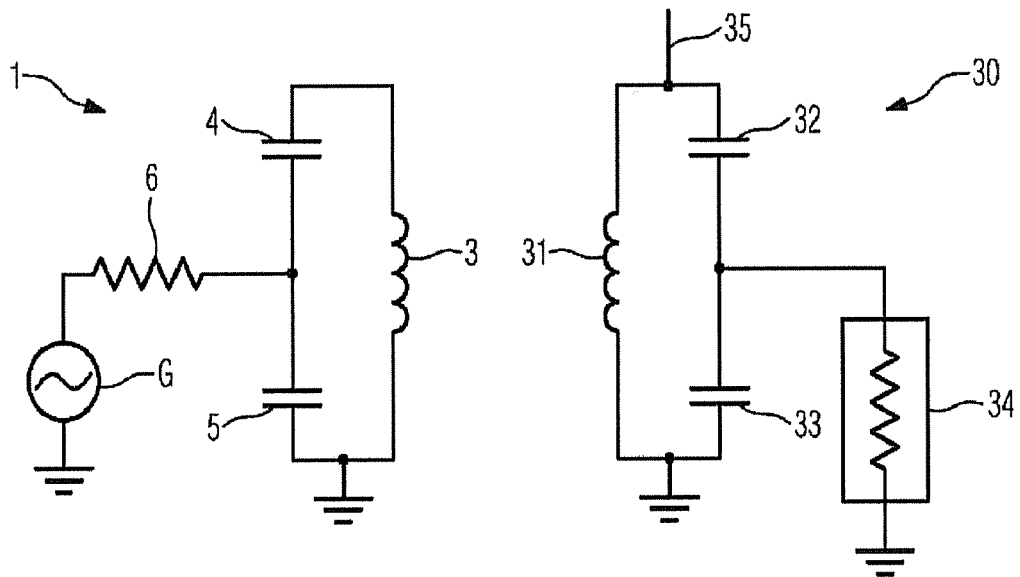
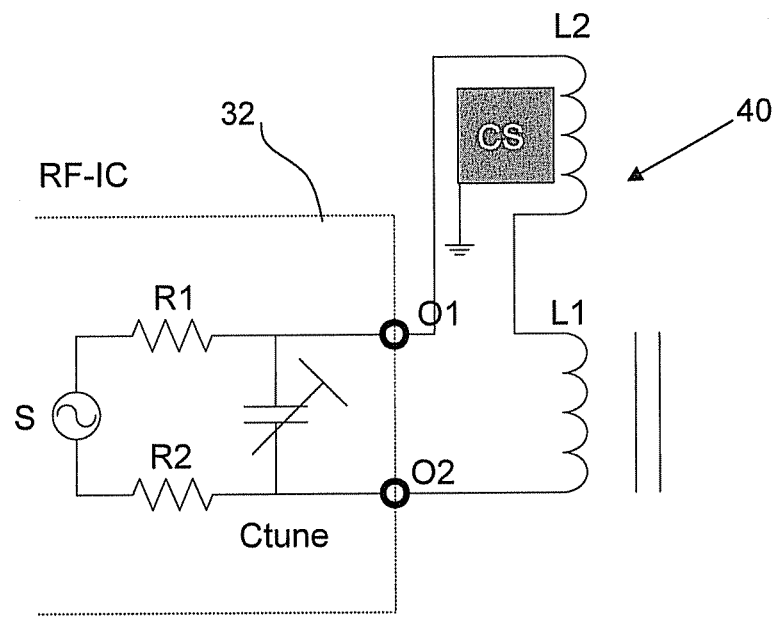
FIG. 3

RADIO RECEIVER AND TRANSMITTER CIRCUITS AND METHODS

CROSS-REFERENCE TO RELATED APPLICATION

This application claims the priority under 35 U.S.C. §119 of European patent application no. 10164872.3, filed on Jun. 3, 2010, the contents of which are incorporated by reference herein.

The invention relates to receiver and transmitter circuits and methods, and particularly for use in communication systems using near field communication.

The invention relates in particular to communication systems which require very low power consumption, for example below 1 mW. Examples are hearing aids, body area networks and wireless health sensors (heart rate monitoring, blood pressure monitoring etc.).

These types of wireless product should be compact while providing sufficient operating range. The available area for antennas is very small compared with the wavelength (<5%).

In the case of a hearing aid system, a known system consists of three transceivers, two of them are employed at the two ears of the user, and a third is used in a remote unit. The remote unit is used for controlling the hearing aids but in addition it has the functionality to stream MP3 music from a portable server device worn on the body.

A variety of technologies are currently used for providing communication in short-range products. One of them is the infrared method. Infrared communication has the disadvantage that the communication can be interrupted when objects are between the transmitter and receiver. Thus, more products are using near field magnetic coupling to establish the wireless connection. Low power magnetic coupled systems have a very short range when the antenna becomes small, as is necessary in a hearing aid.

A difficulty implementing this type of system is thus providing sufficient range for the remote unit, and there is also a problem of range when both communication ends are not aligned with each other. This is due to the magnetic field distribution between two antenna coils which is not equal for all relative orientations of the coils.

There is therefore a need to improve the range and make the connection less dependent on the relative orientation of both communication ends in a magnetically coupled communication system.

EP1966852 describes a near field communication system for improving the range of a magnetically coupled system by adding a monopole or dipole to the main antenna coil. However it is difficult to realize this concept when the design of the RF-IC is of the balanced type in which the signal is between two ports that have the same amplitude and 180 degree phase shift between them, with the ground as reference. A balanced system may be desired for example to reduce noise coupling, but almost no electric field is produced.

Japanese Patent Application publication JP07-303006 A discloses a ferrite bar antenna and its tuning frequency adjusting method. In this disclosure, the inductance can be adjusted by moving the core of the coil in order to adjust a tuning frequency.

According to a first aspect of the invention, there is provided a transmitter circuit comprising a radio frequency circuit which generates a balanced output for wireless transmission to a receiver circuit, and a wireless transmission circuit, wherein the wireless transmission circuit comprises:

a first inductor for generating a magnetic induction field onto which the output of the radio frequency circuit is modulated; and a second inductor in series with the first inductor for generating an electric induction field onto which the output of the radio frequency circuit is modulated, wherein the second inductor comprises an electrically conductive track which at least partially surrounds a grounded electrically conductive core.

According to a second aspect of the invention, there is provided a receiver circuit comprising a radio frequency signal processing circuit for processing a wireless signal transmitted by a transmitter circuit, and a wireless receiver circuit, wherein the wireless receiver circuit comprises:

a first inductor for detecting a magnetic field onto which the wireless signal is modulated; and a second inductor in series with the first inductor for detecting an electric field onto which the wireless is modulated, wherein the second inductor comprises an electrically conductive track which at least partially surrounds a grounded electrically conductive core.

The invention thus provides the transmitter and receiver for a communication system using near fields, and in which the input/output of the radio frequency circuitry can be balanced. The transmit and receive circuits have two coils in a series configuration; the first coil produces the main magnetic induction field and the second coil is wrapped around an electrical conducting structure or plane, which is further connected to system ground. The electrical conducting structure or plane is thus activated as an antenna producing an electric induction field. Any further connection to the activated structure or plane will further enhance the electric induction field. By this method, the operating range is increased and the relative positioning between both communication ends is less sensitive.

This arrangement has the advantages of low cost, increased operational range, reduced sensitivity to relative positioning, small dimensions, and suitability for mobile and portable communication devices. Existing balanced RF-IC's can be used, and an electrical induction field is still produced.

The invention also provides a transceiver comprising a transmitter circuit of the invention and a receiver circuit of the invention. The first and second coils can be shared between the transmitter and receiver circuits.

The electrically conductive core can comprise a ground plane and the electrically conductive track can then be disposed around most of the periphery of the ground plane.

The invention also provides a communication system comprising a transmitter circuit and a receiver circuit, one or both being in accordance with the invention. However, it is not essential that both are in accordance with the invention, as the electric induction field can be detected or generated with a simpler arrangement. The receiver or transmitter can comprise a first inductor for generating or detecting a magnetic field onto which the wireless signal is modulated and an electrically conducting plane connected to the first inductor.

The wireless transmission is preferably at below 50 MHz (for short range transmission and reception), and the receiver circuit has power consumption less than 10 mW.

In one example, the system is a hearing aid system, wherein the receiver circuit comprises an earpiece and the transmitter circuit is for sending signals to the earpiece.

The invention also provides a transmission method comprising generating a balanced output for wireless transmission from a transmitter circuit to a receiver circuit, the method comprising:

generating a magnetic induction field, using a first inductor, onto which the output of the radio frequency circuit is modulated; and generating an electric induction field, using a second inductor in series with the first inductor, onto which the output of the radio frequency circuit is modulated, wherein the second inductor comprises an electrically conductive track which at least partially surrounds an electrically conductive core that is further connected to the system ground.

The invention also provides a reception method for processing a wireless signal transmitted by a transmitter circuit, wherein the method comprises:

detecting a magnetic field, using a first inductor, onto which the wireless signal is modulated; and detecting an electric field, using a second inductor in series with the first inductor, onto which the wireless is modulated, wherein the second inductor comprises an electrically conductive track which at least partially surrounds an electrically conductive core that is further connected to system ground.

These methods can be combined in a communication method.

Examples of the invention will now be described in detail with reference to the accompanying drawings, in which:

FIG. 2 is a transmitter-receiver combination as disclosed in EP1966852;

FIG. 3 shows a first example of transmitter circuit of the invention;

The invention provides a transmitter and/or receiver circuit for short range wireless transmission. A first inductor is used for generating/detecting a magnetic induction field onto which the output of the radio frequency circuit is modulated/detected and a second inductor in series with the first inductor is used for generating/detecting an electric induction field onto which the output of the radio frequency circuit is modulated/detected. Thus, the invention provides a transmitter/receiver circuit comprising a wireless transmission/reception circuit having a first inductor for generating/detecting a magnetic induction field onto which an output of a radio frequency circuit is modulated and a second inductor in series with the first inductor for generating/detecting an electric induction field onto which the output of the radio frequency circuit is modulated. The second inductor comprises an electrically conductive track which at least partially surrounds a grounded electrically conductive core.

Figure 1:
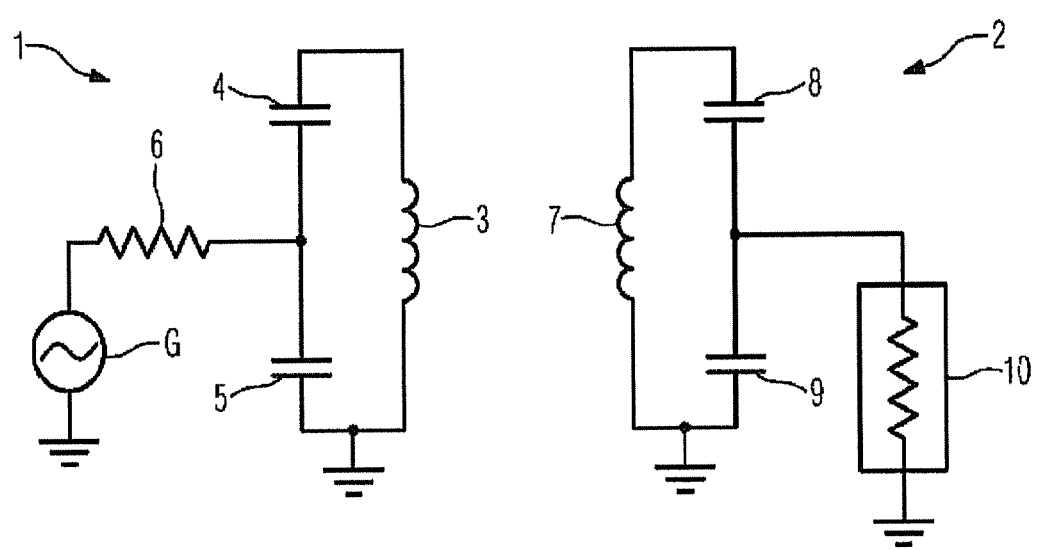
FIG. 1 is a prior art transmitter-receiver combination illustrating the general field of the invention.

FIG. 1 shows the circuit diagram of a transmitter 1, which transmits a signal to a receiver 2. The transmitter 1 and the receiver 2 are set up to be magnetically coupled, i.e. the receiver 2 and the transmitter 1 are spaced apart within a relatively short distance.

The transmitter 1 comprises a signal generator G that generates a signal. This signal is applied to a tuned LC circuit consisting of a coil 3 and two capacitors 4, 5. The coil 3 serves as an antenna of the transmitter 1. The transmitter 1 further comprises an output resistor 6.

The signal generated by the generator G causes a current with a given frequency to flow through the coil 3. Accordingly, the current through the coil 3 generates a magnetic field of a certain wavelength corresponding to the frequency of the current flowing through the coil 3. It is the intention that the coil is very small compared with the wavelength. In such a system there is hardly any electro-magnetic radiation generated (field decrease with $\sim 1/r$, r being the distance between coil 3 and coil 7) but mainly magnetic induction field (field decrease with $\sim 1/r^3$). The magnetic field is coupled with the second circuit according the coupling factor K.

The receiver 2 comprises a coil 7 and two capacitors 8, 9. The coil 7 of the receiver 2 operates as an antenna of the receiver 2. The coil 7 may be an air coil or a coil with a ferrite core. The coil 7 in combination with the two capacitors 8, 9 constitutes a tuned LC-circuit which is configured to supply a low-impedance load 10, for example 50 Ohms. The coil 7 of the receiver 2 captures the magnetic field generated by the coil 3 of the transmitter 1. This induces a current in the coil 7 of the receiver 2. The induced voltage in the second circuit is further amplified by the low noise amplifier of the receiver input.

For the exemplary embodiment, the parameters of the tuned LC-circuit of the receiver 2 and the transmitter 1 are the same. The coils 3, 7 are each cylindrically wound on a ferrite core and each have a dimension of 1.5 mm diameter and 3 mm length. These dimensions are typical of, for example, hearing aid products.

Even though the set-up of FIG. 1 is intended for magnetic coupling of the two coils 3 and 7 and even though the coil 3 of the transmitter 1 is relatively small, the coil 3 emits not just a magnetic induction field, but also a notable electric induction field if the generated signal is unbalanced (as shown). The nearby electrical field originates from the circuit ground plane, the voltage across the terminals of the coil 3, and the dimensions of the coil 3, although the coil 3 is physically relatively small and is intended to generate a magnetic induction field only.

In order to exploit the electric field emitted by the transmitter 1 and thus enhance the performance of the set-up of FIG. 1, the receiver 30 depicted in FIG. 2 has been proposed in EP1966852. The receiver 30 communicates with the transmitter 1 of FIG. 1.

The receiver 30 of FIG. 2 again comprises a coil 31 and two capacitors 32, 33, constituting an LC-circuit which is configured to supply a low-impedance load 34 of 50 Ohms in the exemplary embodiment. The coil 31 is cylindrical, has a diameter of 1.5 mm and a length of 3 mm, and is wound on a ferrite core in the exemplary embodiment. If the received signal has a frequency of up to 30 MHz, then the diameter of a turn of the coil 31 is even less than 0.005 times the wavelength of the received signal (5%). However, the coil 31 with a ferrite core may alternatively be replaced by an air coil. Again, the coil 3 of the transmitter 1 emits a field generated by the tuned circuit that is formed by the capacitors 4, 5 and the coil 3. The transmitted field comprises a magnetic induction field component and an electric induction field component.

The magnetic field component is captured by the coil 31 of the receiver 30, inducing a current with a frequency which corresponds to the wavelength of the received signal.

Additionally, the receiver 30 comprises a monopole antenna 35 connected to the coil 31. By way of example, the monopole antenna 35 is 3 cm long, corresponding to a length of less than 1% of the wavelength of the received signal. The monopole antenna 35 is sensitive to the electric field component of the received signal, thus increasing the sensitivity to received signals in the near field of the receiver 30 of FIG. 3 compared with the receiver 2 of FIG. 1.

With this method the coupling between two tuned circuits is improved. However the resonance frequency of the circuit is influenced by user handling since direct influence on the capacitive antenna is seen at the resonance circuit. This circuit is also only feasible when the RF-IC has an unbalanced output with a reference to the ground potential.

FIG. 3 shows a first embodiment of present invention, in the form of a circuit which can be used both as the transmitter and as the receiver circuit.

A balanced input (for the receiver circuit) or output (for the transmitter circuit) of the Radio IC 32 is provided to two coils L1, L2 in a series arrangement.

For the transmitter circuit, the output amplifier of the RF-IC drives the output voltage through both coils, L1 and L2. The current through the first coil, L1 is used to generate the main magnetic induction field. The second coil L2 is wrapped around a electrical conductive structure or plane and further connected to the system ground. The current through the second coil L2 generates a magnetic induction field which introduces an electrical current in the electrical conducting structure or plane that generates an electrical induction field.

For the receiver circuit, the RF-IC recovers the signal from both coils, L1 and L2. The first coil, L1 is used to detect the main magnetic induction field. The second coil L2 is used to detect the electrical induction field.

Coil L2 can be a copper track on a printed circuit board or flex while the electrical conductive structure can be the ground area already available on the printed circuit board. In this way no more volume is required.

Since the electric induction field is mainly produced/detected from a structure which is not strongly coupled with the resonating circuit, tuning of the resonance by the integrated capacitor bank is conducted in the same way as if without coil L2.

Increasing the surface and volume of the conducting structure will enhance the electric field generation/detection. Tuning of the resonance circuit by means of the internal capacitor bank will not change much from the original capacitor value particularly if the value of the inductance of coil L2 is lower than for coil L1. The inductance value of coil L2 is further reduced because the core material is a conducting structure which produces a counter magnetic field against the magnetic field generated by coil L2.

The coil L1 can have core material (such as ferrite material) to increase the inductance and magnetic field.

Figure 4:
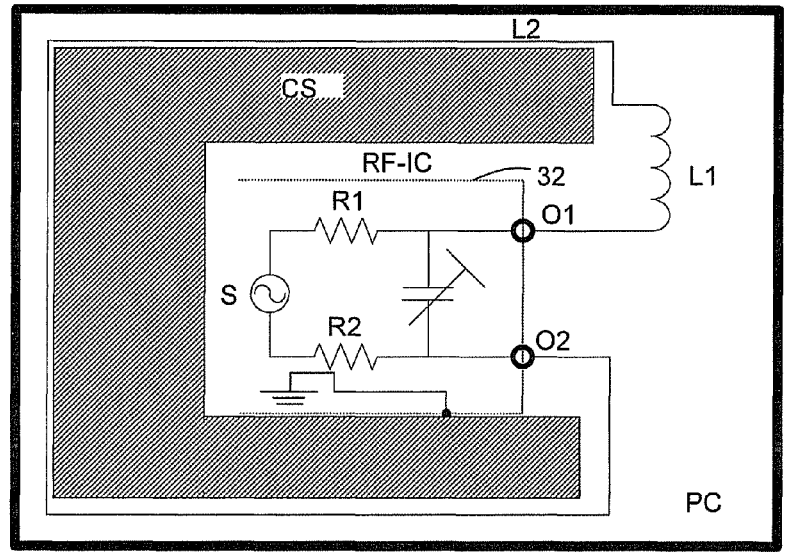
FIG. 4 shows how the circuit of FIG. 3 can be implemented.

FIG. 4 shows how the circuit of FIG. 3 can be implemented. The Radio Frequency IC 32 has a balanced input/output at terminals O1 and O2. The coil L2 is formed by a copper track on a printed circuit board. The coil L2 is wrapped around an electrical conducting plane, CS, which is further connected to the system ground of the RF-IC. In this practical example no extra volume is required to generate the electric induction field.

Figure 5:
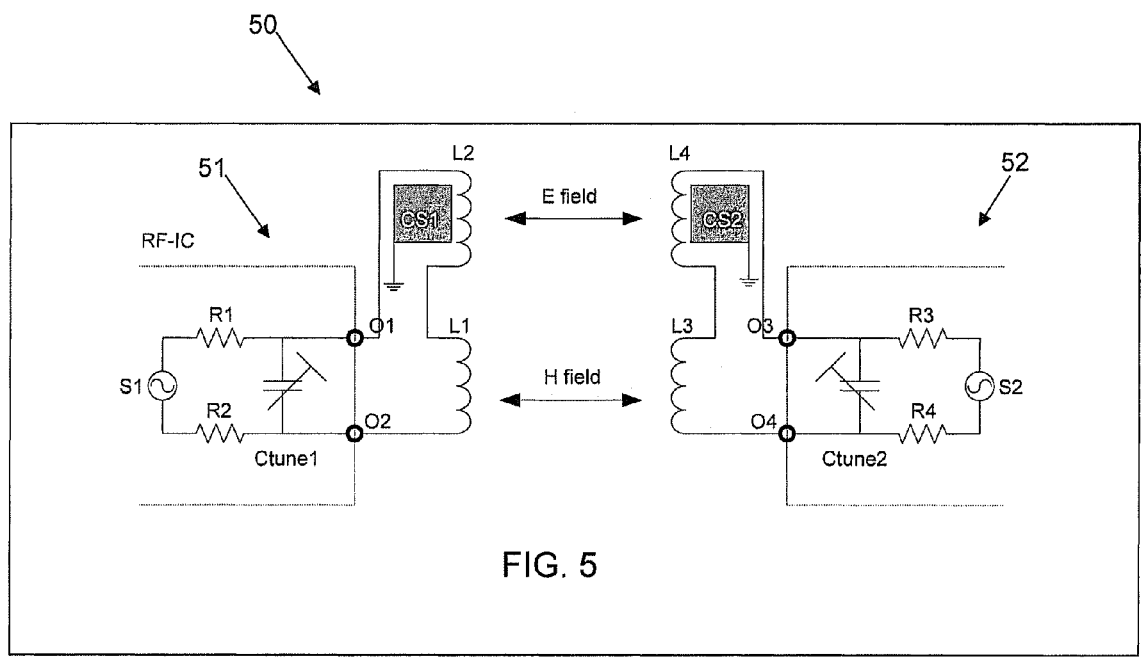
FIG. 5 shows a first example of communication system according to the invention.

FIG. 5 shows a first example of communication system according to the invention.

One communication device 51 functions as transmitter and another 52 functions as receiver.

Both communication devices use the same circuit as described above. At both sides, for example a hearing aid and a hearing aid controller, two coils are used that are connected to the input/output of the Radio IC. Coil L2 and coil L4 are wrapped around an electrical conducting structure that is further grounded to the system. With this method both magnetic and electric induction field is created with a balanced configuration of RF IC.

Figure 6:
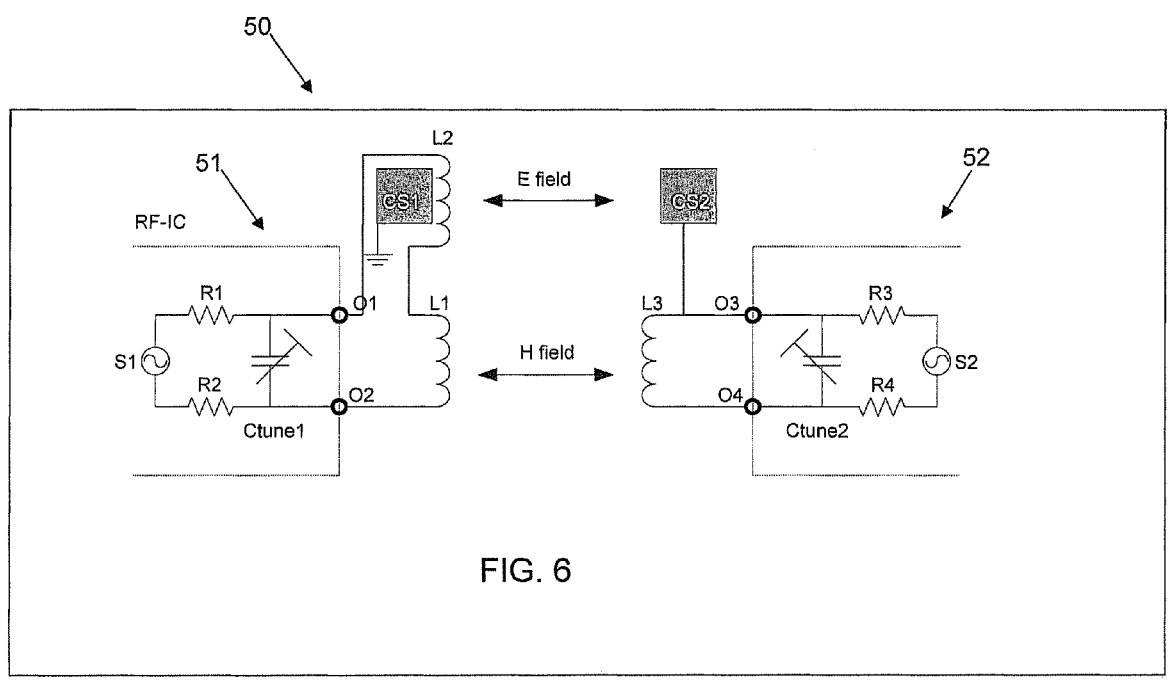
FIG. 6 shows a second example of communication system according to the invention.

FIG. 6 shows a second example of communication system according to the invention.

At both ends of the communication system, balanced input/output RF ICs are used. One of the communication ends (i.e. transmitter or receiver) has only one coil, L3. This coil is generating the main magnetic induction field while at one side of the coil, L3 an electrical conducting volume is connected. Since this electrical conducting volume is connected to half of the output voltage across the coil L3, a moderate electric induction field is created/detected. However the existing ground plane does not in this case act as antenna (so that further electrical connections to the ground plane will not influence the electric field).

This solution is interesting when combined a transmitter or receiver is combined with a receiver or transmitter (respectively) as described above. This may be desired if there is insufficient physical volume available to implement the arrangement described above both at the transmitter and receiver ends. The detuning of the resonance circuit is minor since the capacitive antenna and capacitance value is small due to restricted available volume.

The invention is of particular interest for short range wireless communication devices that are operating in frequency bands below 50 MHz, although the invention can also be used for other frequency bands.

The receiver can be used in a wide range of products, such as an RFID tag, a smart card, a mobile device, or a hearing aid.

The arrangement of FIGS. 5 and 6 can be used as a hearing aid comprising a first module and a second module which communicates wirelessly with the first module.

Figure 7:
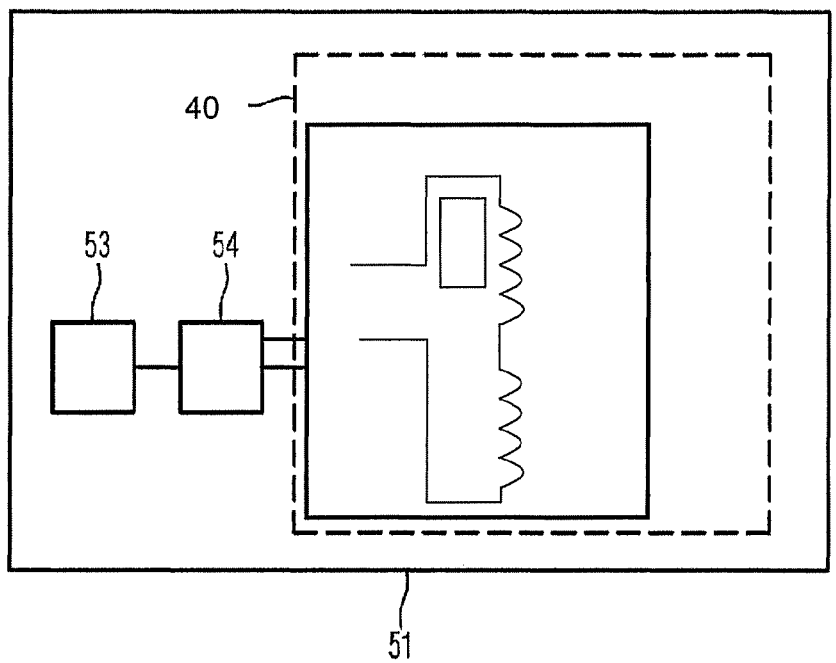
FIG. 7 shows a hearing aid system.
Figure 7:
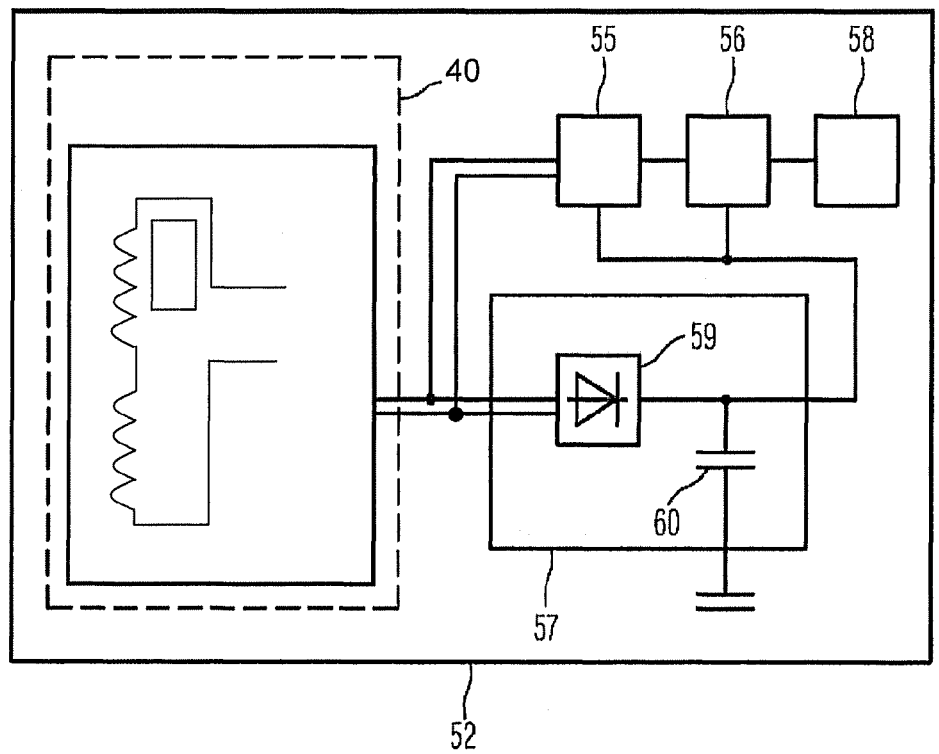

The arrangement 50 is shown in more detail in FIG. 7. The transmitter and receiver circuit are shown schematically as 40, corresponding to the circuits previously described.

The first module 51 comprises the transmitter 40, a music or speech storage medium in the form of an MP3 player module 53, and a microcontroller 54 connected downstream of the MP3 player module. The microcontroller 54 modulates the music or speech signals stored and reproduced by the MP3 player 53 in a well known order so that the modulated signals can be transmitted by the transmitter with a carrier frequency of about 30 MHz in this embodiment. An energy source in the form of a battery supplying the MP3 module 53 and the microcontroller 54 is not shown for the sake of clarity.

The second module 52 comprises the receiver 40, a signal-processing unit 55, an amplifier 56 connected downstream of the signal-processing unit 55, an energy supply 57, and an in-ear loudspeaker 58 connected downstream of the amplifier 56. The signal-processing unit 55 demodulates the received signals and passes the demodulated signals, which correspond to the music or speech signals of the MP3 module 53, on to the amplifier 56. The amplifier 56 amplifies the music or speech signals and passes the amplified signals on to the in-ear loudspeaker 58.

The energy supply 57 comprises a rectifier 59 and a charge capacitor 60. The rectifier 59 rectifies the current of the LC-circuit of the receiver 30 in a well known manner in order to charge the charge capacitor 60. The charge capacitor 60 supplies the signal-processing unit 55 and the amplifier 56 with electrical energy.

In the examples above, the second inductor has an electrical conductive core. By this is meant the inductor coil or coils surrounds an electrically conductive body, either in two dimensions (such as on a planar PCB as described) or in three dimensions. For example, a conventional cyclindrical coil can surround an electrical conductive core.

The conductive core is preferably non-magnetic (which will apply to typical conductors) so that the magnetic field generated is small compared to that generated by the first inductor.

Examples of suitable electrical conducting materials are copper with conductivity $5.96 \times 10^7$ Siemens/meter or iron with conductivity $1.04 \times 10^7$ Siemens/meter. The conductivity is preferably at least $10^5$ Siemens/meter. Mica can be used as the core for the first inductor core with a low conductivity of $10^{-7}$ Siemens/meter.

Inductance values will typically range between 1 and 20 µH for an operating frequency of 10 MHz.

The transmission and reception functions have been described separately in the description above. In practice, all components in a system can be arranged for bidirectional communication. In this case, each unit has a transceiver. If the transceiver needs to have very small area (or volume), the transmitter circuit and receiver circuit can be of the type having only a single coil (as shown in FIG. 6). If there is sufficient space for a ground plane, the transmitter circuit and receiver circuit can be of the type having two coils. In a transceiver circuit, the radiation parts (i.e. the coil or pair of coils) can be shared between the transmit and receive circuitry, in conventional manner.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A transmitter circuit including a radio frequency circuit which generates a balanced output for wireless transmission to a receiver circuit, and a wireless transmission circuit, the wireless transmission circuit comprising:
   a first inductor for generating a magnetic induction field onto which the output of the radio frequency circuit is modulated; and
   a second inductor in series with the first inductor for generating an electric induction field onto which the output of the radio frequency circuit is modulated, the second inductor having an electrically conductive track which at least partially surrounds an electrically conductive core that is connected to the system ground.

2. A circuit as claimed in claim 1, wherein the electrically conductive core comprises a ground plane and the conductive track is disposed around at least a portion of a periphery of the ground plane.

3. A receiver circuit including a radio frequency signal processing circuit for processing a wireless signal transmitted by a transmitter circuit, and a wireless receiver circuit, the wireless receiver circuit comprising:
   a first inductor for detecting a magnetic field onto which the wireless signal is modulated; and
   a second inductor in series with the first inductor for detecting an electric field onto which the wireless is modulated, the second inductor having an electrically conductive track which at least partially surrounds an electrically conductive core that is connected to the system ground.

4. A circuit as claimed in claim 3, wherein the electrically conductive core comprises a ground plane and the conductive track is disposed around at least a portion of a periphery of the ground plane.

5. A transceiver comprising:
   a transmitter circuit as claimed in claim 1; and
   a receiver circuit including including a radio frequency signal processing circuit for processing a wireless signal transmitted by a transmitter circuit, and a wireless receiver circuit, the wireless receiver circuit including,
   a first inductor for detecting a magnetic field onto which the wireless signal is modulated; and
   a second inductor in series with the first inductor for detecting an electric field onto which the wireless is modulated, the second inductor having an electrically conductive track which at least partially surrounds an electrically conductive core that is connected to the system ground.

6. A communication system comprising:
   a transmitter circuit as claimed in claim 1; and
   a receiver circuit including a radio frequency signal processing circuit for processing a wireless signal transmitted by a transmitter circuit, and a wireless receiver circuit, the wireless receiver circuit including;
   a first inductor for detecting a magnetic field onto which the wireless signal is modulated, and
   a second inductor in series with the first inductor for detecting an electric field onto which the wireless is modulated, the second inductor having an electrically conductive track which at least partially surrounds an electrically conductive core that is connected to the system ground.

7. A system as claimed in claim 6, wherein the receiver circuit further includes:
   a radio frequency signal processing circuit for processing a wireless signal transmitted by the transmitter circuit, and a wireless receiver circuit, wherein the wireless receiver circuit comprises:
   a first inductor for detecting a magnetic induction field onto which the wireless signal is modulated; and
   a ground plane connected to the first inductor.

8. A system as claimed in claim 6, wherein the wireless transmission is at below 50 MHz, and wherein the receiver circuit has power consumption less than 10 mW.

9. A system as in claim 6, wherein the system is a hearing aid system, wherein the receiver circuit includes an earpiece, and the transmitter circuit is for sending signals to the earpiece.

10. A transmission method of generating a balanced output for wireless transmission from a transmitter circuit to a receiver circuit, the method comprising:
    generating a magnetic induction field, using a first inductor, onto which the output of the radio frequency circuit is modulated; and
    generating an electric induction field, using a second inductor in series with the first inductor, onto which the output of the radio frequency circuit is modulated,
    wherein the second inductor includes an electrically conductive track which at least partially surrounds an electrically conductive core that is connected to the system ground.

11. A reception method for processing a wireless signal transmitted by a transmitter circuit, wherein the method comprises:
    detecting a magnetic field, using a first inductor, onto which the wireless signal is modulated; and detecting an electric field, using a second inductor in series with the first inductor, onto which the wireless is modulated, wherein the second inductor comprises an electrically conductive track which at least partially surrounds an electrically conductive core that is further connected to the system ground.

12. A communication method comprising:

transmitting a wireless signal from a transmitter as claimed in claim 10, and receiving the wireless signal by detecting the magnetic field and the electric field in a receiver by processing a wireless signal transmitted by a transmitter circuit by;
    detecting the magnetic field, using a first inductor, onto which the wireless signal is modulated; and
    detecting the electric field, using a second inductor in series with the first inductor, onto which the wireless is modulated, wherein the second inductor includes an electrically conductive track which at least partially surrounds an electrically conductive core that is further connected to the system ground.

* * * * *